(12) United States Patent
Sulai et al.

(10) Patent No.: US 10,185,393 B2
(45) Date of Patent: Jan. 22, 2019

(54) WAVEGUIDE DISPLAY WITH SPATIALLY SWITCHABLE GRATING

(71) Applicant: Facebook Technologies, LLC, Menlo Park, CA (US)

(72) Inventors: Yusufu Njoni Bamaxam Sulai, Bothell, WA (US); Wai Sze Tiffany Lam, Redmond, WA (US); Lu Lu, Seattle, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

(21) Appl. No.: 15/477,187

(22) Filed: Apr. 3, 2017

(65) Prior Publication Data
US 2018/0284884 A1   Oct. 4, 2018

(51) Int. Cl.
*G09G 5/00* (2006.01)
*G06F 3/01* (2006.01)
*G02B 27/01* (2006.01)
*G02F 1/01* (2006.01)

(52) U.S. Cl.
CPC .......... *G06F 3/013* (2013.01); *G02B 27/0172* (2013.01); *G02F 1/011* (2013.01); *G02B 2027/0138* (2013.01); *G02B 2027/0187* (2013.01)

(58) Field of Classification Search
USPC ............ 345/8, 633, 589, 207, 156, 428, 211
See application file for complete search history.

(56) References Cited

U.S. PATENT DOCUMENTS

| | | | | |
|---|---|---|---|---|
| 2012/0235883 A1* | 9/2012 | Border | ............... | G02B 27/0093 345/8 |
| 2012/0235885 A1* | 9/2012 | Miller | ................ | G02B 27/0093 345/8 |
| 2012/0235887 A1* | 9/2012 | Border | ............... | G02B 27/0093 345/8 |
| 2012/0242698 A1* | 9/2012 | Haddick | ............ | G02B 27/0093 345/633 |
| 2014/0168260 A1* | 6/2014 | O'Brien | ................. | G09G 5/377 345/633 |

(Continued)

OTHER PUBLICATIONS

Bos, P., "Fast-Switching Liquid-Crystal Effects for Displays," SID Information Display, ID Archive, 2011-2015, 8 pages, retrieved on Jun. 28, 2017, retrieved from the Internet: <http://informationdisplay.org/IDArchive/2007/September/FastSwitchingLiquidCrystalEffectsforDisplays.aspx>.

(Continued)

*Primary Examiner* — Thuy Pardo
(74) *Attorney, Agent, or Firm* — Fenwick & West LLP

(57) ABSTRACT

A near-eye-display (NED) includes an eye tracking system and a waveguide display. The eye tracking system tracks locations based on a location of the user's eyes. The waveguide display includes a light source, an output waveguide and a controller. The output waveguide includes a dynamic output grating that outputs an expanded image light to the tracked eyebox locations. The decoupling grating is a 2D array of spatially switchable liquid crystal (LC) pixels including an active subset of LC pixels emitting light to regions within the tracked eyebox locations. The decoupling grating dynamically out-couples the expanded image light to the tracked location based on switching instructions generated and provided by the controller.

16 Claims, 7 Drawing Sheets

(56) References Cited

U.S. PATENT DOCUMENTS

| | | | | |
|---|---|---|---|---|
| 2015/0002528 | A1* | 1/2015 | Bohn | G02B 27/0172 345/589 |
| 2016/0041384 | A1* | 2/2016 | Robbins | G02B 27/0093 345/156 |
| 2016/0055822 | A1* | 2/2016 | Bell | G02B 27/0172 345/207 |
| 2016/0379606 | A1* | 12/2016 | Kollin | G02B 27/0093 345/428 |
| 2017/0131546 | A1* | 5/2017 | Woltman | G02B 5/1866 345/207 |
| 2017/0131551 | A1* | 5/2017 | Robbins | G02B 5/1828 345/8 |
| 2017/0139210 | A1* | 5/2017 | Vallius | G02B 5/1842 345/8 |
| 2017/0153460 | A1* | 6/2017 | Vallius | G02B 27/0172 345/8 |
| 2017/0184848 | A1* | 6/2017 | Vallius | G02B 3/14 345/8 |
| 2018/0052325 | A1* | 2/2018 | Bohn | G02B 26/005 345/8 |
| 2018/0130391 | A1* | 5/2018 | Bohn | G02B 26/0883 345/8 |

OTHER PUBLICATIONS

Compound Photonics, "4K Display, Features, Applications," 2017-2018, 2 pages, retrieved on Jun. 28, 2017, retrieved from the Internet: <https://www.compoundphotonics.com/products/4k-display/>.

Jasper Display Corporation, "The World's Smallest Pixel 4K2K LCoS Microdisplay, JD4704, Won the 2014 Taiwan Outstanding Photonics Product Award," Success Story, Jul. 4, 2014, 3 pages, retrieved from the Internet: <http://www.jasperdisplay.com/success-stories/>.

Okada, N., et al., "Horizontally Scanning Holography to Enlarge Both Image Size and Viewing Zone Angle," SPIE Proceedings, Practical Holography XXIII: Materials and Applications, Feb. 3, 2009, vol. 7233, 8 pages.

Srivastava, A. K., et al., "Fast Switchable Grating Based on Orthogonal Photo Alignments of Ferroelectric Liquid Crystals," AIP Applied Physics Letters, Jul. 2012, vol. 101, Issue 3, 8 pages, retrieved from the Internet: <http://aip.scitation.org/doi/abs/10.1063/1.4737642?journalCode=apl&>.

Szentesi, J., et al., "Holographic 3D Visualization, Development of the Next Generation Holo-Display Based on Emerging Optical and Opto-Electronic Technologies," State of the Art in LCOS, Holovision, Apr. 30, 2008, Project No. IST-FP6-004524, retrieved from the Internet: <http://holovisionproject.holografika.eu/news_files/60_53.2_2%20State-of-the-art%20in%20LCOS_public>.

Young, L. R., et al., "Survey of Eye Movement Recording Methods," Behavior Research Methods & Instrumentation, 1975, vol. 7, Issue 5, pp. 397-429.

* cited by examiner

WAVEGUIDE DISPLAY WITH SPATIALLY SWITCHABLE GRATING

BACKGROUND

The present disclosure generally relates to waveguide displays, and specifically to spatially switching the image light exiting from the waveguide display according to eye movements.

Near-eye light field displays project images directly into a user's eye, encompassing both near-eye displays (NEDs) and electronic viewfinders. Conventional near-eye displays (NEDs) generally have a display element that generates image light that passes through one or more lenses before reaching the user's eyes. Additionally, NEDs in augmented reality systems are typically required to be compact and light weight, and to provide large exit pupil with a wide field-of-vision for ease of use. However, designing a conventional NED with scanners providing high brightness and uniform illumination intensity can result in a low outcoupling efficiency of the image light received by the user's eyes.

SUMMARY

A near-eye display (NED) includes an eye tracking system and a waveguide display. The eye tracking system tracks and moves eyebox locations based on a movement of the user's eyes. The waveguide display includes a light source, an output waveguide and a controller. The output waveguide includes an input grating that receives an image light from the light source, and expands the received image light in at least one dimension to transmit an expanded image light. The output waveguide includes a dynamic output grating made of liquid crystal (LC) pixels that are arranged in a two-dimensional array. In some configurations, the two-dimensional array of LC pixels are a linear waveplate with a periodically varying LC director. The LC pixels includes an active subset of LC pixels that out-couples the expanded image light from the output waveguide to the tracked location based on switching instructions generated and provided by the controller. The dynamic output grating outputs the expanded image light to one or more eyebox locations tracked by the eye tracking system.

In some configurations, the controller determines an eyebox location based on the tracked location of the eye from the eye tracking system. The controller determines a subset of LC pixels that emit light in the regions that fall within the eyebox location. For example, in some embodiments, the spatially movable eyebox has a diameter of at most 5 mm and corresponds to a location of a pupil of the user's eye. The controller generates the switching instructions that cause the dynamic output grating to activate the subset of LC pixels to form the active subset of LC pixels. Accordingly, the LC pixels that are not in the active subset are in an inactive subset of LC pixels that do not out-couple light from the dynamic output grating, so no light is lost and more light is guided to the user's eye. Each LC pixel is coupled to a control electrode that sets an activation state of the LC pixel based on the switching instructions generated and provided by the controller.

In a different embodiment, a waveguide assembly includes the output waveguide and the controller. The output waveguide includes the input grating and the dynamic output grating. The controller generates and provides the switching instructions to the dynamic output grating.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Overview

A near-eye-display (NED) includes an eye tracking system and a waveguide display. The eye tracking system tracks and moves eyebox locations based on a movement of the user's eyes. The waveguide display includes a source assembly, an output waveguide and a controller. The output waveguide includes a coupling grating that receives an image light from the source assembly, and a decoupling grating that outputs the expanded image light to one or more eyebox locations.

The decoupling grating is a 2D array of spatially switchable liquid crystal (LC) gratings. The 2D array of spatially switchable LC gratings include an active subset of LC pixels outcoupling an expanded image light from the output waveguide to a location of the user's eye tracked by the eye tracking system. The decoupling grating dynamically adjusts where the image light exits by controlling the LC gratings corresponding to the eyebox location. In this manner, the NED is able to output the expanded image light in an eyebox that in tandem with the movements of the eye. The controller generates switching instructions to the 2D array of LC gratings to dynamically activate the LCs based on the tracked eye movements.

Figure 1:
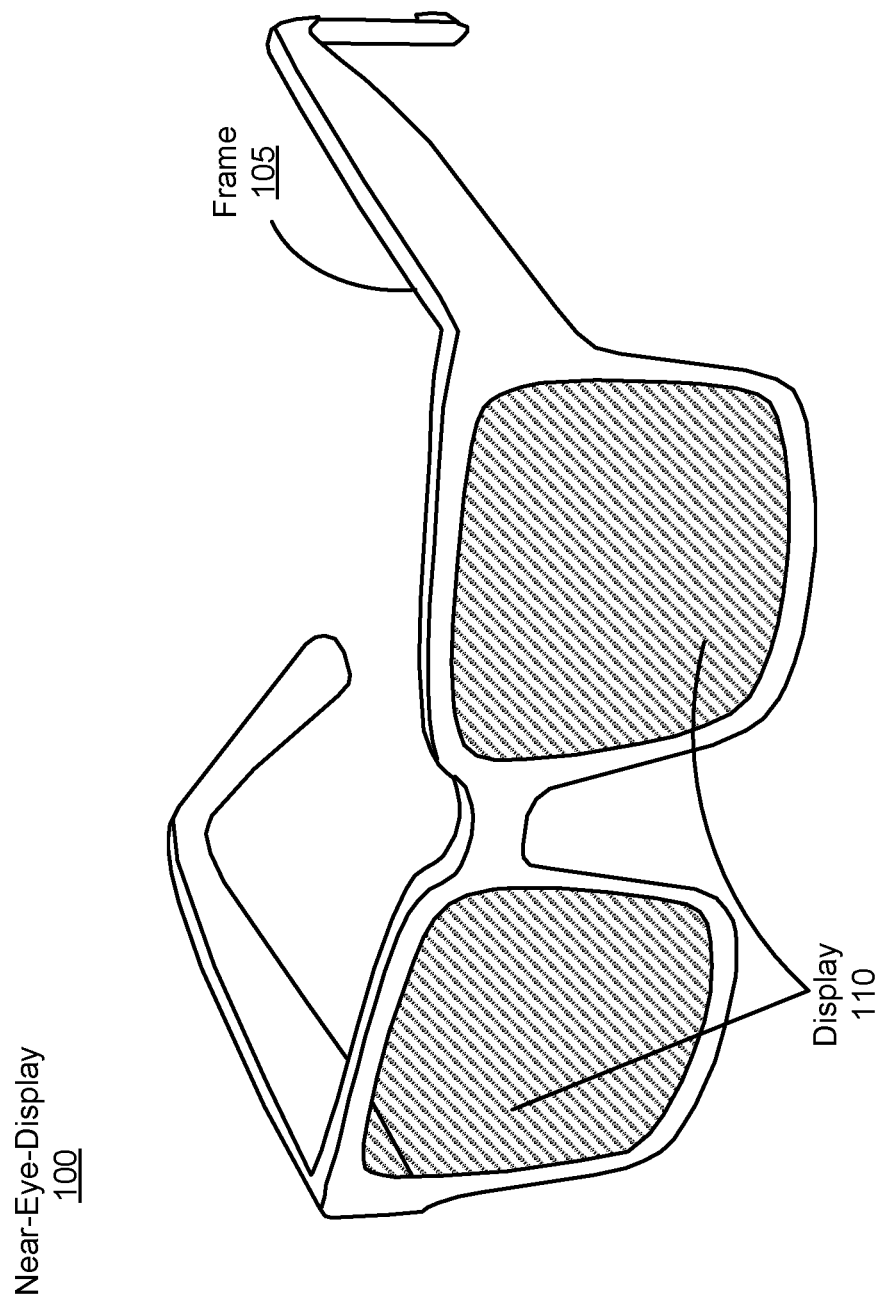
FIG. 1 is a diagram of a NED, in accordance with an embodiment.

FIG. 1 is a diagram of a near-eye-display (NED) 100 (also referred to as a head-mounted display), in accordance with an embodiment. The NED 100 presents media to a user. Examples of media presented by the NED 100 include one or more images, video, audio, or some combination thereof. In some embodiments, audio is presented via an external device (e.g., speakers and/or headphones) that receives audio information from the NED 100, a console (not shown), or both, and presents audio data based on the audio information. The NED 100 is generally configured to operate as a virtual reality (VR) NED. However, in some embodiments, the NED 100 may be modified to also operate as an augmented reality (AR) NED, a mixed reality (MR) NED, or some combination thereof. For example, in some embodiments, the NED 100 may augment views of a physical, real-world environment with computer-generated elements (e.g., images, video, sound, etc.).

The NED 100 shown in FIG. 1 includes a frame 105 and a display 110. The frame 105 includes one or more optical elements which together display media to users. The display 110 is configured for users to see the content presented by the NED 100. As discussed below in conjunction with FIG. 2, the display 110 includes at least one source assembly to generate an image light to present media to an eye of the user. The source assembly includes, e.g., a source, an optics system, or some combination thereof.

Figure 2:
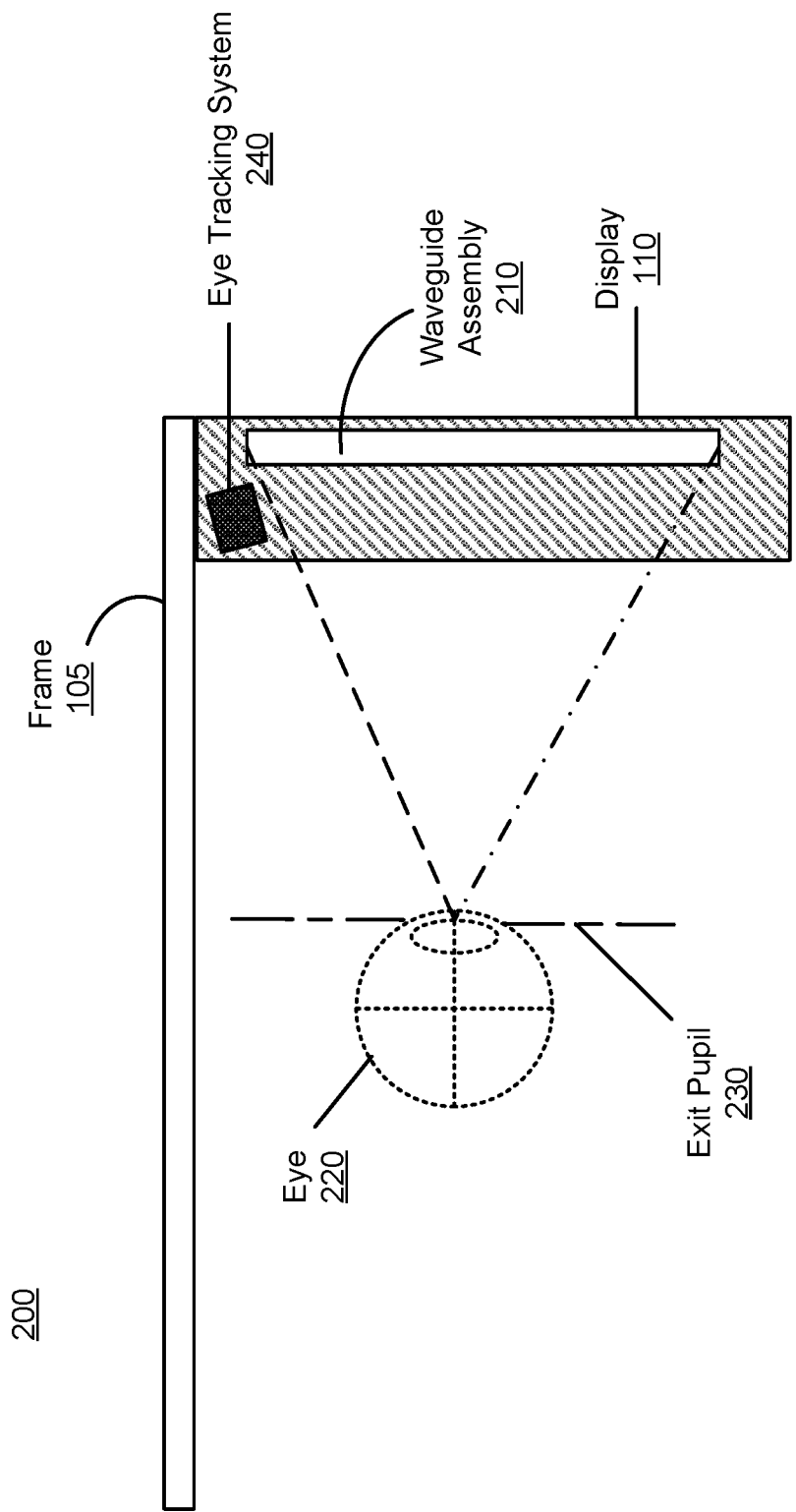
FIG. 2 is a cross-section of the NED illustrated in FIG. 1, in accordance with an embodiment.

FIG. 2 is a cross section 200 of the NED 100 illustrated in FIG. 1, in accordance with an embodiment. The cross section 200 includes at least one waveguide assembly 210, an exit pupil 230, and an eye tracking system 240. The exit pupil 230 is a location where the eye 220 is positioned when the user wears the NED 100. In some embodiments, the frame 105 may represent a frame of eye-wear glasses. For purposes of illustration, FIG. 2 shows the cross section 200 associated with a single eye 220 and a single waveguide assembly 210, but in alternative embodiments not shown, another waveguide assembly which is separate from the waveguide assembly 210 shown in FIG. 2, provides image light to another eye 220 of the user.

Figure 3:
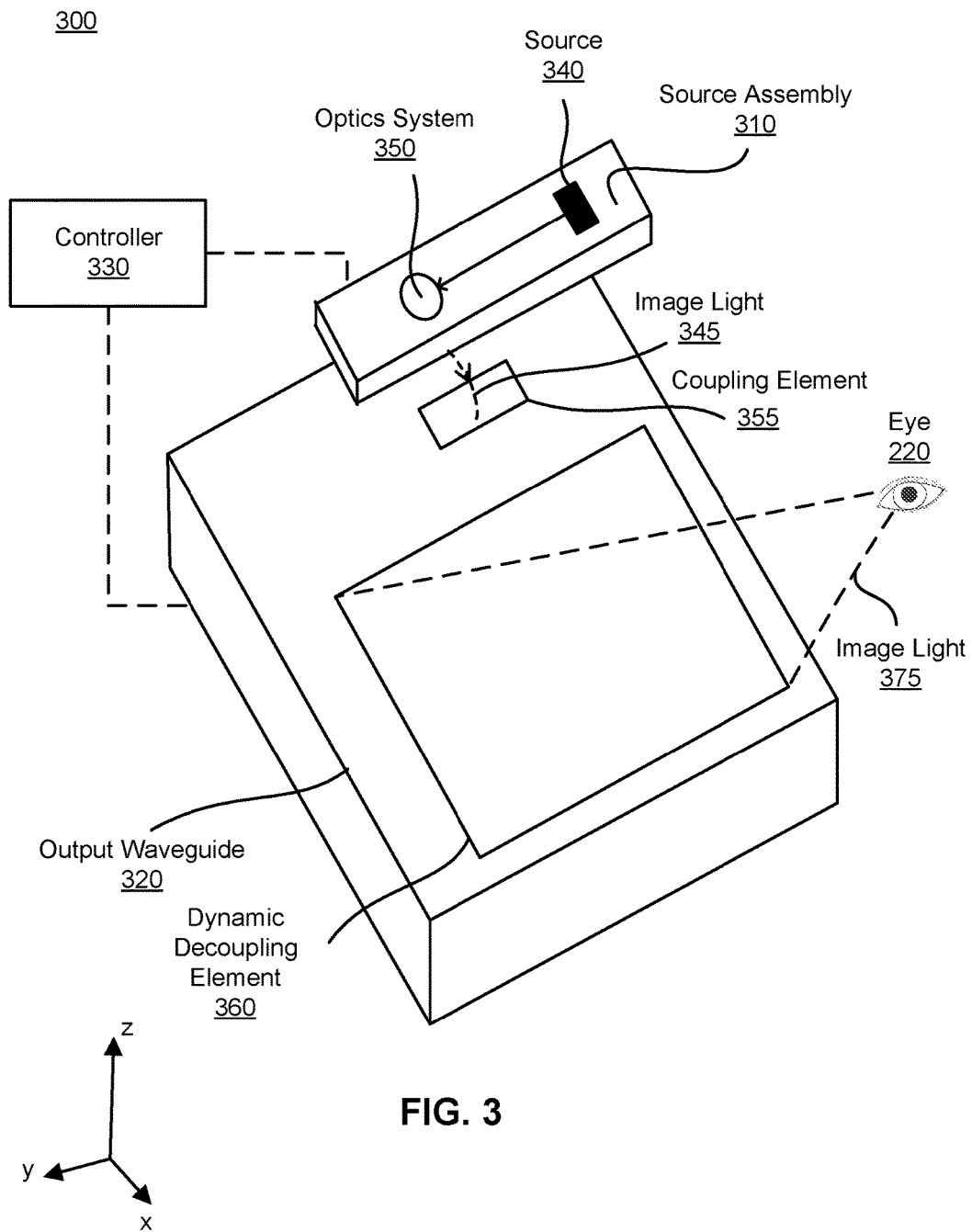
FIG. 3 illustrates an isometric view of a waveguide display, in accordance with an embodiment.

The waveguide assembly 210, as illustrated below in FIG. 3, is configured to direct the image light to the eye 220 through the exit pupil 230. The waveguide assembly 210 may be composed of one or more materials (e.g., plastic, glass, etc.) with one or more refractive indices that effectively minimize the weight and widen a field of view (hereinafter abbreviated as 'FOV') of the NED 100. In alternate configurations, the NED 100 includes one or more optical elements between the waveguide assembly 210 and the eye 220. The optical elements may act to, e.g., correct aberrations in image light emitted from the waveguide assembly 210, magnify image light emitted from the waveguide assembly 210, some other optical adjustment of image light emitted from the waveguide assembly 210, or some combination thereof. The example for optical elements may include an aperture, a Fresnel lens, a convex lens, a concave lens, a filter, or any other suitable optical element that affects image light.

In some embodiments, the waveguide assembly 210 may include a source assembly to generate an image light to present media to user's eyes. The source assembly includes, e.g., a source, an optics system, or some combination thereof.

The eye tracking system 240 tracks a position and movement of a user's eye at one or more eyebox locations of the NED 100. The eyebox location is a region that outputs an image light corresponding to the media presented through the NED 100. In one example, the eyebox location includes a length of 20 mm and a width of 10 mm. A camera or other optical sensor inside the NED 100 controlled by the eye tracking system 240 captures images of one or both eyes of the user, and the eye tracking system 240 uses the captured images to determine eye tracking information. Eye tracking information is an information associated with a position and/or movement of a user's eye at one or more eyebox locations. For example, the eye tracking information may include, e.g., an interpupillary distance, an interocular distance, a three-dimensional (3D) position of each eye relative to the NED 100 for distortion adjustment purposes, including a magnitude of torsion and rotation, and gaze directions for each eye. The eye tracking system 240 tracks different types of eye movements including, but not restricted to, a saccadic eye movement (e.g rapid and conjugate movements), a pursuit movement (e.g. a slow-tracking), a compensatory eye movement (e.g. smooth movements compensating for active or passion motions), a vergence eye movement (e.g. two eye moving in opposite directions), a miniature eye movement (e.g. a steady and fixed view of a target), an optokinetic nystagmus (e.g. a sawtooth pattern), or some combination thereof.

FIG. 3 illustrates an isometric view of a waveguide display 300, in accordance with an embodiment. In some embodiments, the waveguide display 300 is a component (e.g., display assembly 210) of the NED 100. In alternate embodiments, the waveguide display 300 is part of some other NED, or other system that directs display image light to a particular location.

The waveguide display 300 includes at least a source assembly 310, an output waveguide 320, and a controller 330. For purposes of illustration, FIG. 3 shows the waveguide display 300 associated with a single eye 220, but in some embodiments, another waveguide display separate (or partially separate) from the waveguide display 300, provides image light to another eye of the user. In a partially separate system, one or more components may be shared between waveguide displays for each eye.

The source assembly 310 generates image light. The source assembly 310 includes a source 340 and an optics system 350. The source 340 is an optical source that generates an image light, as described in detail below with regard to FIG. 4. The optics system 350 is a set of optical components (e.g. lens, mirrors, etc.) that direct the image light received from the source 340. The source assembly 310 generates and outputs an image light 345 to a coupling element 355 of the output waveguide 320.

The output waveguide 320 is an optical waveguide that outputs image light to one or more eyebox locations associated with the eye 220 of a user. The output waveguide 320 receives the image light 345 at one or more coupling elements 355, and guides the received input image light to one or more dynamic decoupling elements 360. In some embodiments, the coupling element 355 couples the image light 345 from the source assembly 310 into the output waveguide 320. The coupling element 355 may be, e.g., a diffraction grating, a holographic grating, some other element that couples the image light 345 into the output waveguide 320, or some combination thereof. For example, in embodiments where the coupling element 355 is diffraction grating, the pitch of the diffraction grating is chosen such that total internal reflection occurs, and the image light 345 propagates internally toward the decoupling element 360. For example, the pitch of the diffraction grating may be in the range of 300 nm to 600 nm.

The dynamic decoupling element 360 dynamically decouples the total internally reflected image light from the output waveguide 320. The dynamic decoupling element 360 includes a two-dimensional array of liquid crystal gratings and control electrodes as described below in conjunction with FIG. 4. In some configurations, the dynamic decoupling element 360 is transparent in a visible band of light. The dynamic decoupling element 360 dynamically decouples the total internally reflected image light based on a switching of an active subset of LC pixels in the two-dimensional array of liquid crystal gratings located at different portions for a threshold value of switching time in response to the positions and/or movements of the user's eyes tracked by the eye tracking system 240. The dynamic decoupling element 360 may be, e.g., a diffraction grating, a holographic grating, some other element that decouples image light out of the output waveguide 320, or some combination thereof.

The dynamic decoupling element 360 includes an off-element, an on-element and one or more control electrodes, as described in detail below in conjunction with FIG. 4. Each of the off-element and the on-element is a two-dimensional array of liquid crystal (LC) gratings. In some configurations, the on-element has a length of 5 mm along the X dimension and a width of 5 mm along the Y dimension to cover an eye pupil with a diameter of at most 5 mm. The on-element is made of LC pixels controlled by a pixelated electrode with size as small as 3 microns. In one example, the on-element has a length of 10 microns and receives an electrical bias from the control electrode. Each LC pixel in the dynamic decoupling element 360 is coupled to the control electrode that sets an activation state of the LC pixel.

In embodiments where the dynamic decoupling element 360 is a diffraction grating, the pitch of the diffraction grating is chosen to cause incident image light to exit the output waveguide 320. For example, the pitch of the diffraction grating may be in the range of 300 nm to 600 nm. The pitch of the diffraction grating is chosen such that the image light 345 from the plurality of optical sources undergoes a total internal reflection inside the output waveguide 320 without leakage through higher order diffraction (e.g. second reflected order). An orientation and position of an image light 375 exiting from the output waveguide 320 is controlled by changing an orientation and position of the image light 345 entering the coupling element 355. In some embodiments, the direction of the image light 375 exiting from the output waveguide 320 is same as the direction of the image light 345. In one example, the position of the image light 375 exiting from the output waveguide 320 is controlled by the location of the plurality of optical sources of the source assembly 310, the location of the coupling element 355, the location of the dynamic decoupling element 360, and a switching of liquid crystal gratings of the dynamic decoupling element 360.

In alternate embodiments, the coupling element 355 includes at least one of one-dimensional array and two-dimensional array of liquid crystal gratings and control electrodes (not shown here). The coupling element 355 receives a right circularly polarized image light 345 from the source assembly 310 and diffracts a left circularly polarized image light of first order to the dynamic decoupling element 460.

The output waveguide 320 may be composed of one or more materials that facilitate total internal reflection of the image light 345. The output waveguide 320 may be composed of e.g., silicon, plastic, glass, or polymers, or some combination thereof. The output waveguide 320 has a relatively small form factor. For example, the output waveguide 320 may be approximately 50 mm wide along X-dimension, 30 mm long along Y-dimension and 0.5-1 mm thick along Z-dimension.

The controller 330 controls the scanning operations of the source assembly 310. The controller 330 determines scanning instructions for the source assembly 310 based at least on the one or more display instructions. Display instructions are instructions to render one or more images. In some embodiments, display instructions may simply be an image file (e.g., bitmap). The display instructions may be received from, e.g., a console of a system (e.g., as described below in conjunction with FIG. 6). Scanning instructions are instructions used by the source assembly 310 to generate the image light 345. The scanning instructions may include, e.g., a type of a source of image light (e.g. monochromatic, polychromatic), an identifier for a particular source assembly, a scanning rate, an orientation of the source, one or more illumination parameters (described below with reference to FIG. 4), or some combination thereof.

The controller 330 takes content for display, and divides the content into discrete sections. The controller 330 instructs the source 340 to sequentially present the discrete sections using individual source elements corresponding to a respective row in an image ultimately displayed to the user. The controller 330 instructs the optics system 350 to scan the presented discrete sections to different areas of the coupling element 355 of the output waveguide 320. Accordingly, at the exit pupil of the output waveguide 320, each discrete portion is presented in a different location. While each discrete section is presented at different times, the presentation and scanning of the discrete sections occurs fast enough such that a user's eye integrates the different sections into a single image or series of images.

The controller 330 determines switching instructions for the control electrode in the dynamic decoupling element 360 based on the eye tracking information received from the eye tracking system 240. The controller 330 uses the received eye tracking information to predict the position and/or movement of user's eyes and then generates switching instructions based on this prediction. The switching instructions may include, e.g. a switching time, an electrical bias, a spatial location of one or more pixels of the control electrode, or some combination thereof. The switching time is a time difference between the first instance when the control electrode receives zero electrical bias and the second instance when the control electrode receives a non-zero electrical bias. In one example, the switching instruction includes a switching time of 0.1 ms and the address (e.g. x-y co-ordinates) of the pixels of the control electrode. In some embodiments, the controller 330 determines an eyebox location based on the locations of the eyes tracked by the eye tracking system 240. The controller 330 determines a subset of LC pixels that emit light and falling within the eyebox location. The controller 330 generates the switching instructions causing the dynamic decoupling element 360 to activate the subset of LC pixels to form an active subset of LC pixels. The controller 330 generates the switching instructions such that the LC pixels that are not in the active subset are in an inactive subset of LC pixels that do not out-couple light from the dynamic decoupling element 360. The controller 330 generates the switching instructions such that each LC pixel that is coupled to the control electrode is set to an activation state. For example, the activation state of a LC pixel refers to a preferred spatial orientation of a LC molecule in an arbitrary direction in a three-dimensional space. The controller 330 includes a combination of hardware, software, and/or firmware not shown here so as not to obscure other aspects of the disclosure.

Figure 4:
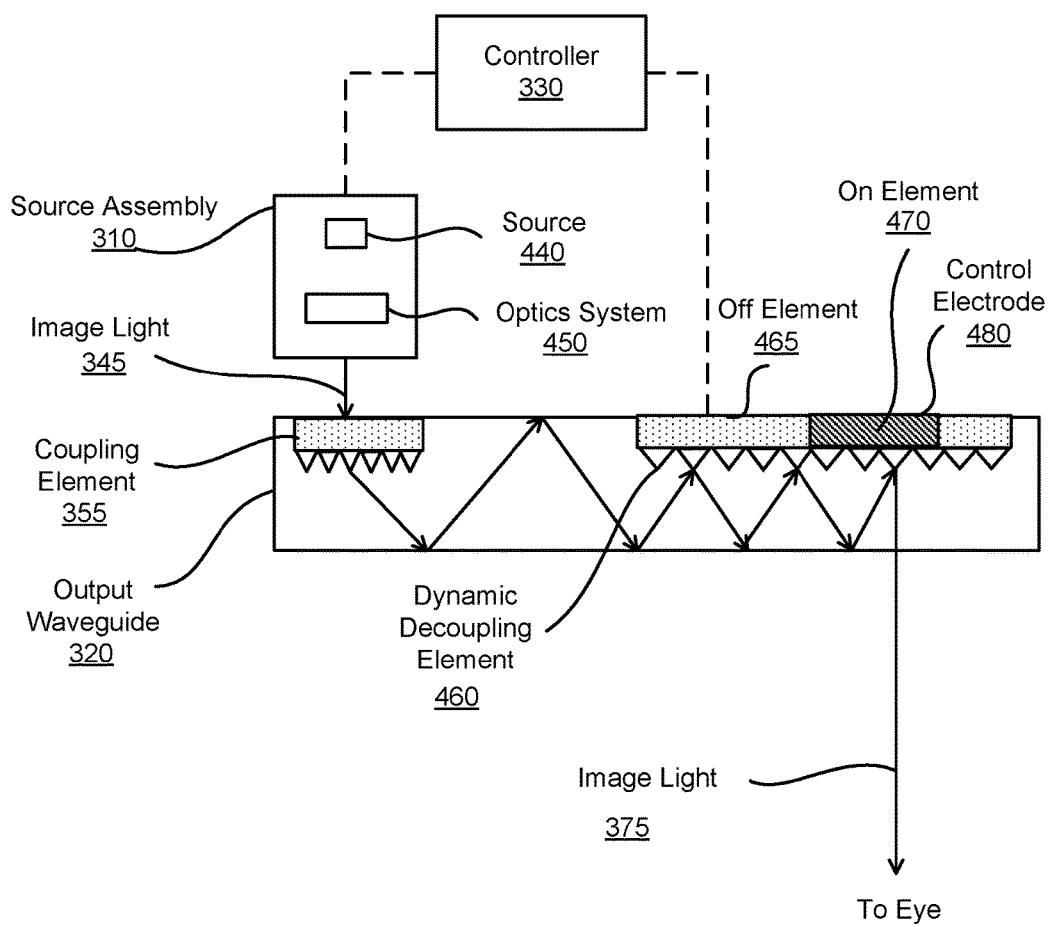
FIG. 4 illustrates a cross-section of the waveguide display of FIG. 3, in accordance with an embodiment.

FIG. 4 illustrates a cross section 400 of the waveguide display 300 of FIG. 3, in accordance with an embodiment. The cross section 400 includes the source assembly 310 and the output waveguide 320. The source assembly 310 includes a source 440 and an optics system 450. The source 440 is an embodiment of the source 340 of FIG. 3. The optics system 450 is an embodiment of the optics system 350 of FIG. 3. The output waveguide 320 includes the coupling element 355 and a dynamic decoupling element 460.

The source assembly 310 generates light in accordance with scanning instructions from the controller 330. The source assembly 310 includes a source 440, and an optics system 450. The source 440 is a source of light that generates a spatially coherent or a partially spatially coherent image light. The source 440 may be, e.g., a superluminous LED, a laser diode, a vertical cavity surface emitting laser (VCSEL), a light emitting diode, a tunable laser, or some other light source that emits coherent or partially coherent light. The source 440 emits light in a visible band (e.g., from about 390 nm to 700 nm), and it may emit light that is continuous or pulsed. In some embodiments, the source 440 may be a superluminous LED (SLED) array of densely packed ridge waveguides with a wide emission spectrum. The source 440 emits light in accordance with one or more illumination parameters received from the controller 330. An illumination parameter is an instruction used by the source 440 to generate light. An illumination parameter may include, e.g., source wavelength, pulse rate, pulse amplitude, beam type (continuous or pulsed), other parameter(s) that affect the emitted light, or some combination thereof.

The optics system 450 includes one or more optical components that condition the light from the source 440. Conditioning light from the source 440 may include, e.g., expanding, collimating, adjusting orientation in accordance with instructions from the controller 330, some other adjustment of the light, or some combination thereof. The one or more optical components may include, e.g., lenses, mirrors, apertures, gratings, or some combination thereof. Light emitted from the optics system 450 (and also the source assembly 310) is the image light 345. The optics system 450 outputs the image light 345 at a particular orientation (in accordance with the scanning instructions) toward the output waveguide 320.

The dynamic decoupling element 460 is an embodiment of the dynamic decoupling element 360 of FIG. 3. In this example, the dynamic decoupling element 460 includes an off-element 465, an on-element 470 and one or more control electrodes 480. The off-element 465 are a plurality of liquid crystal (LC) gratings in a state that prevents light from outcoupling from the output waveguide 320. And the on-element 470 is a plurality of LC gratings in a state that decouple light to the output waveguide 320. A LC grating includes liquid crystal molecules from a group including, but not restricted to, a thermotropic LC, a lyotropic LC, a metallotropic LC, or some combination thereof. The thermotropic LC shows a phase transition into the liquid-crystal phase with a change in temperature. The lyotropic LC shows phase transitions based on both temperature and concentration of the LC molecules in water. The metallotropic LC includes both organic and inorganic molecules but their liquid-crystal transition depends on temperature, concentration, and the inorganic-organic composition ratio.

The control electrode 480 is an electrical component that applies an electrical bias to the dynamic decoupling element 460. In the example of FIG. 4, the control electrode 480 is a transparent conducting electrode that controls the off-element 465 and the on-element 470 based on the switching instructions from the controller 330. The control electrode 480 is composed of one or more pixels of transparent conducting materials such as Indium Tin Oxide (ITO), transparent conductive oxides (TCO), graphene, etc. Each pixel of the control electrode 480 has a diameter in the order of few microns that in combination covers an eye pupil of size in the order of few millimeters. In one example, the control electrode 480 includes pixels with a diameter of three microns corresponding to an eye pupil with a diameter of three millimeters. In some embodiments, the dynamic decoupling element 460 is a two-dimensional array of LC gratings with a thickness ranging from submicron to a few microns and a birefringence ranging from 0.1 to 0.3. In some configurations, the dynamic decoupling element 460 receives a right circularly polarized image light directly from the source assembly 310 (not shown here) and dynamically decouples a right circularly polarized image light of zeroth order of diffraction and a left circularly polarized image light of first order of diffraction In some configurations, the dynamic decoupling element 460 has a diffraction efficiency of $\sin^2(\delta/2)$ for a first diffraction order and $\cos^2(\delta/2)$ for a zeroth diffraction order, where $\delta$ is the retardance magnitude in radians provided by the LC gratings for an image light with a wavelength $\lambda$. The retardance magnitude $\delta$ for a layer of LC gratings with LC directors oriented in one direction is $(2\pi/\lambda)\Delta n x t$ where t is the thickness of LC gratings and $\Delta n$ is the birefringence of the LC gratings with a certain orientation of the LC director. In some configurations, along the on-element 470, all LC directors are oriented in the X-Y plane and thus provides the same retardance magnitude, but a periodically varying retardance orientation. If $\delta$ is $\pi$ radians, diffraction efficiency of the zeroth order and the first order are 0% and 100% respectively. The off-element 465 includes a first set of liquid crystals whose directors are oriented out of the plane of the surface of the output waveguide 320. In the example of FIG. 4, the off-element 465 includes liquid crystals oriented along the Z direction. The on-element 470 includes a second set of liquid crystals oriented along the surface of the output waveguide 320. In the example of FIG. 4, the on-element 470 is oriented along the X-Y plane. In some configurations, the dynamic decoupling element 460 includes a two-dimensional array of LCs with a spatial arrangement forming a linear waveplate with a periodically varying LC director. The periodicity in variation of the LC molecules varies the optical phase of the light passing through this LC layer periodically, similar to a diffraction grating, and diffracts light based on the light's polarization. In this embodiment, an alignment layer would orient the LC directors within the array of LCs in the x-y plane. In the example of FIG. 4, the dynamic decoupling element 460 includes LCs with a periodically varying direction of preferred orientation of LC molecules along the X-Y plane. The period of varying direction of the preferred orientation of the LC gratings controls the diffraction angle, following the grating equation.

The controller 330 determines switching instructions for the control electrode 480 in the output waveguide 320, as described above in conjunction with FIG. 3. The controller 330 determines switching instructions to efficiently decouple the image light 375 to the eye 220. The decoupled light has a very high brightness and is uniform, and corresponds to a portion of the output waveguide 320 that is currently being viewed by the user's eye.

Figure 5A:
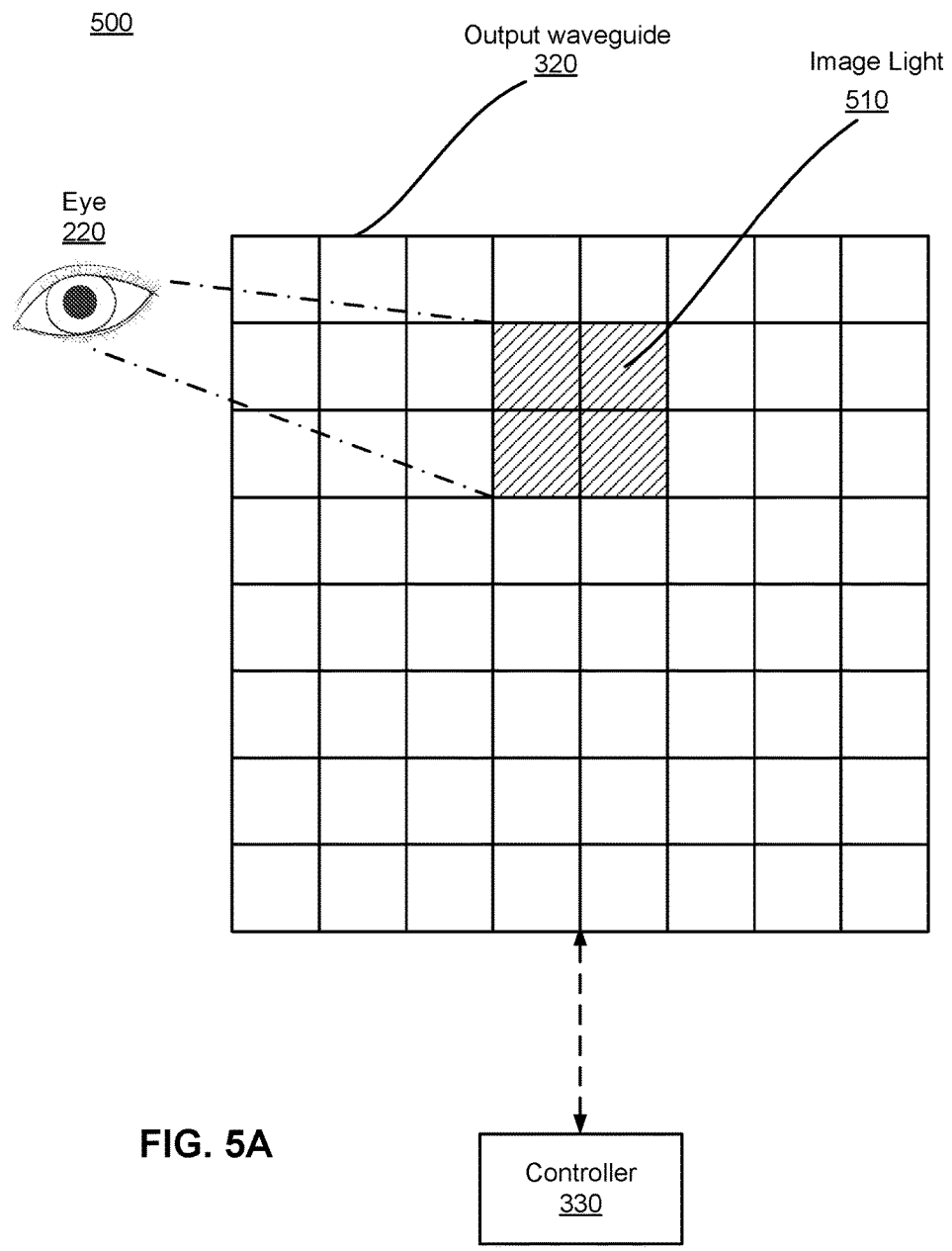
FIG. 5A is a first portion of the output waveguide, in accordance with an embodiment.

FIG. 5A is a first portion 500 of the output waveguide 320, in accordance with an embodiment. The first portion 500 illustrates the output waveguide 320 emitting an image light 510 to a first eyebox location that is occupied by an eye of the user. The output waveguide 320 emits the image light 510 based on the scanning instructions and switching instructions from the controller 330.

Figure 5B:
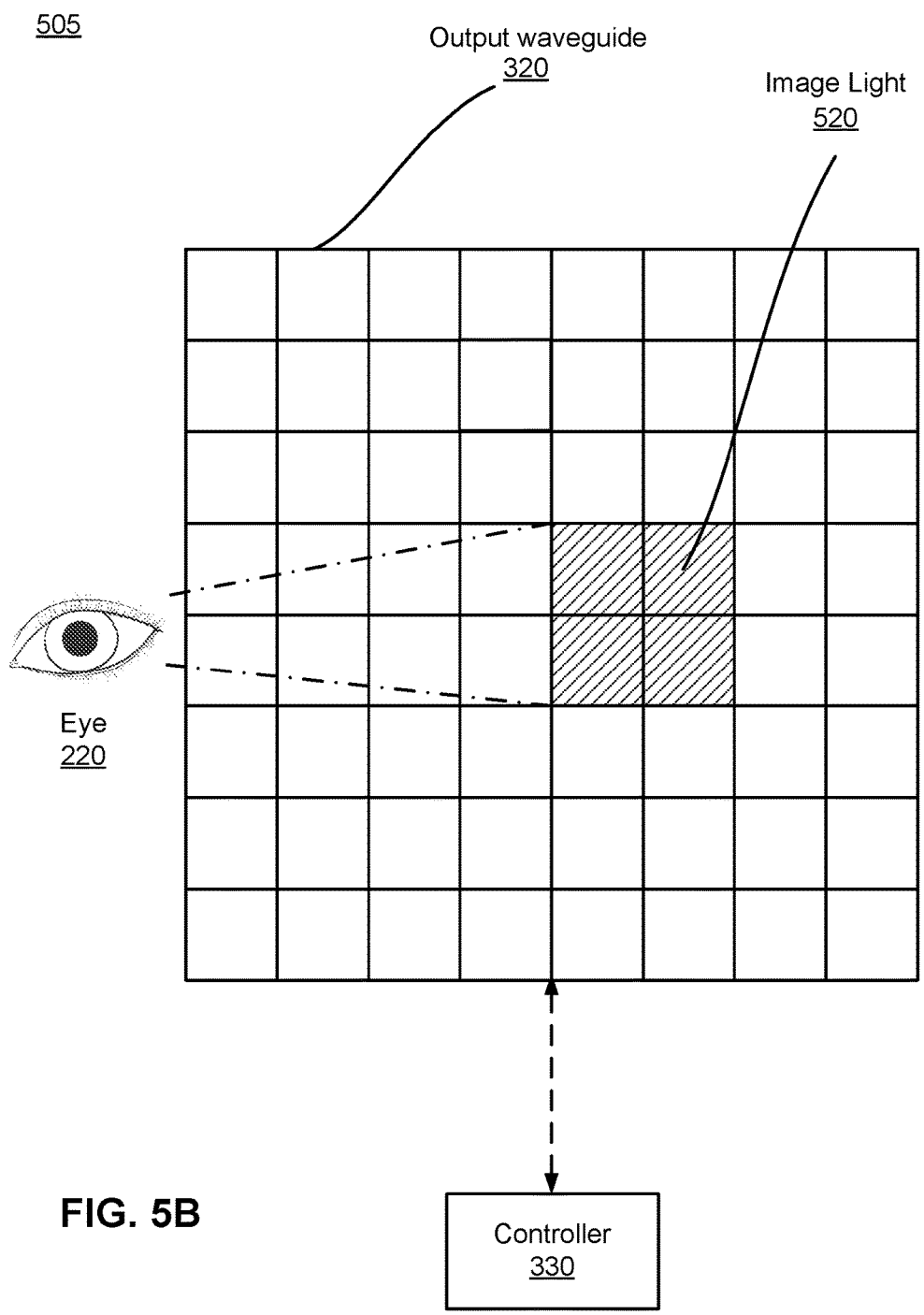
FIG. 5B is a second portion of the output waveguide, in accordance with an embodiment.

The image light 510 is an embodiment of the image light 375 of FIG. 3. The image light 510 is a portion of the media presented to a user's eye 220 wearing the NED 100. The output waveguide 320 emits the image light 510 based on a switching of the two-dimensional array of LC gratings for 0.05 to 0.1 milliseconds. In alternate configurations, as shown in FIG. 5B, the output waveguide 320 emits the image light 510 from a different portion of the output waveguide 320 corresponding to a different eyebox location based on an eye movement tracked by the eye tracking system 240. The controller 330 receives the tracked eye movement from the eye tracking system 240 and instructs the output waveguide 320 to activate some of the LC gratings to match with the current position of the eye 220.

FIG. 5B is a second portion 505 of the output waveguide 320, in accordance with an embodiment. The second portion 505 illustrates the output waveguide 320 emitting an image light 520 to a second eyebox location that includes the eye 220. The output waveguide 320 emits the image light 520 based on the scanning instructions and switching instructions from the controller 330. The image light 520 is an embodiment of the image light 375 of FIG. 3. The output waveguide 320 emits the image light 520 from a second portion of the output waveguide 320 corresponding to a second eyebox location based on the eye movement tracked by the eye tracking system 240. In the example of FIG. 5B, the image light 520 corresponds to the second portion of the output waveguide 320 which is relatively smaller in size when compared to the image light 510 of FIG. 5A and also from a different location on the output waveguide 320.

Figure 6:
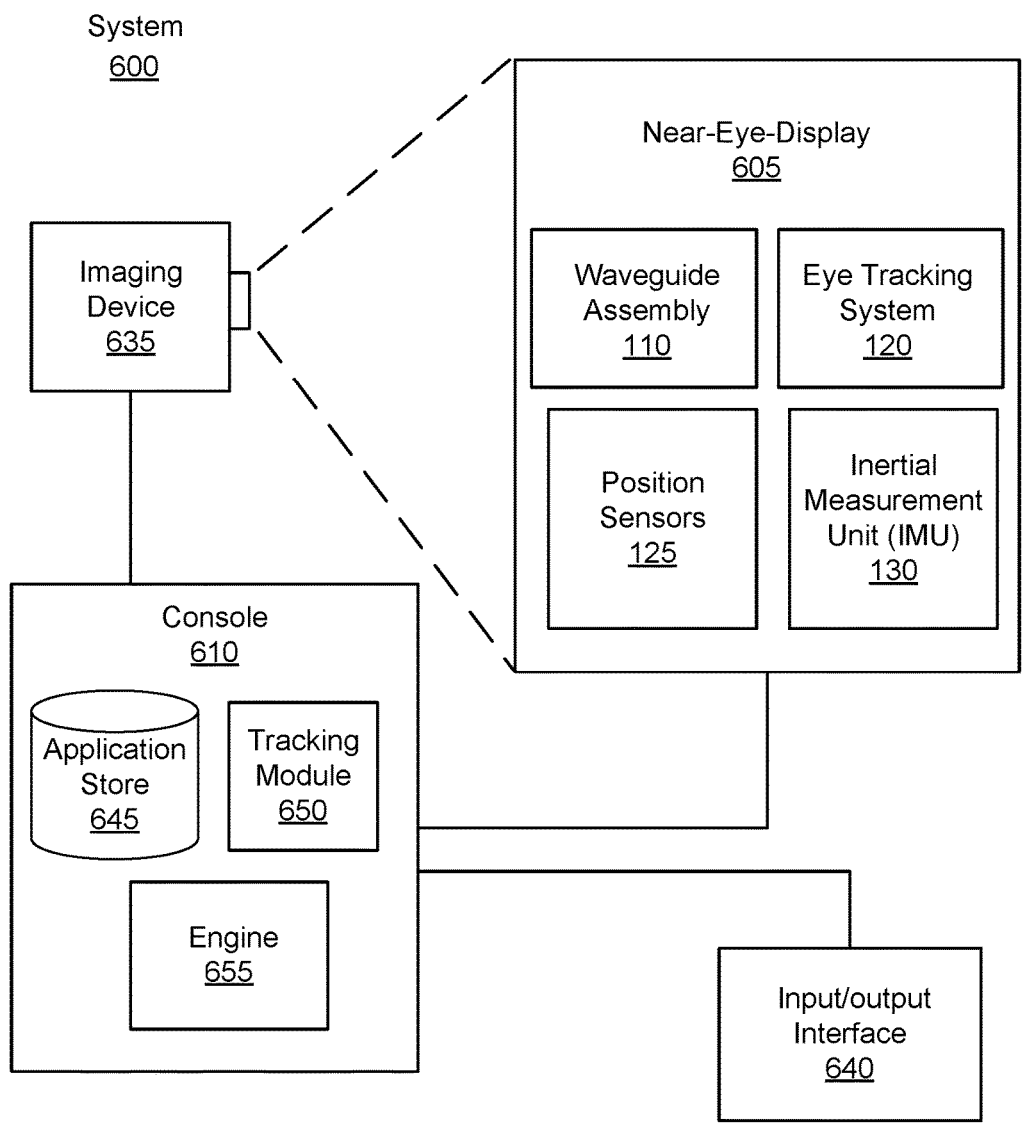
FIG. 6 is a block diagram of a system including the NED, in accordance with an embodiment.

FIG. 6 is a block diagram of a system 600 including a NED 605, according to an embodiment. The system 600 shown by FIG. 6 comprises the NED 605, an imaging device 635, and an input/output interface 640 that are each coupled to the console 610. While FIG. 6 shows an example system 600 including one NED 605, one imaging device 635, and one input/output interface 640, in other embodiments, any number of these components may be included in the system 600. For example, there may be multiple NEDs 100 each having an associated input/output interface 640 and being monitored by one or more imaging devices 635, with each NED 605, imaging devices 635, and the input/output interface 640, communicating with the console 610. In alternative configurations, different and/or additional components may be included in the system 600. Similarly, functionality of one or more of the components can be distributed among the components in a different manner than is described here. For example, some or all of the functionality of the console 610 may be contained within the NED 605. Additionally, in some embodiments, the system 600 may be modified to include other system environments, such as an AR system environment.

The NED 605 inside the system 600 is an embodiment of the NED 100 of FIG. 1. The NED 605 is a near-eye display that presents media to a user. Examples of media presented by the NED 605 include one or more images, video, audio, or some combination thereof. In some embodiments, audio is presented via an external device (e.g., speakers and/or headphones) that receives audio information from the NED 605, the console 610, or both, and presents audio data based on the audio information. In some embodiments, the NED 605 may also act as an AR eye-wear glass. In these embodiments, the NED 605 augments views of a physical, real-world environment with computer-generated elements (e.g., images, video, sound, etc.).

The waveguide assembly 210, as illustrated above in conjunction with FIG. 3, is configured to direct an image light to user's eyes wearing the NED 605. The waveguide assembly 210 may be composed of one or more materials (e.g., plastic, glass, etc.) with one or more refractive indices that effectively minimize the weight. The waveguide assembly 210 may include a source assembly to generate an image light to present media to user's eyes and an output waveguide with a coupling element and a dynamic decoupling element. The dynamic decoupling element decouples the total internally reflected image light from the output waveguide. The dynamic decoupling element includes a two-dimensional array of liquid crystal gratings and control electrodes as described above in conjunction with FIGS. 3-5B. In some examples, the dynamic decoupling element includes an off-element, an on-element and one or more control electrodes, as described above in conjunction with FIG. 4. Each of the off-element and the on-element is a two-dimensional array of liquid crystal (LC) gratings. The source assembly includes, e.g., a source, an optics system, or some combination thereof.

The eye tracking system 120 tracks a position and/or movement of a user's eye at one or more eyebox locations of the NED 605. A camera or other optical sensor inside the NED 605 captures information of user's eyes, and the eye tracking system 120 uses the captured information to determine interpupillary distance, interocular distance, a three-dimensional (3D) position of each eye relative to the NED 605 (e.g., for distortion adjustment purposes), including a magnitude of torsion and rotation (i.e., roll, pitch, and yaw) and gaze directions for each eye. The eye tracking system 120 tracks different types of eye movements including, but not restricted to, a saccadic eye movement (e.g rapid and conjugate movements), a pursuit movement (e.g. a slow-tracking), a compensatory eye movement (e.g. smooth movements compensating for active or passion motions), a vergence eye movement (e.g. two eye moving in opposite directions), a miniature eye movement (e.g. a steady and fixed view of a target), an optokinetic nystagmus (e.g. a sawtooth pattern), or some combination thereof.

The IMU 130 is an electronic device that generates fast calibration data indicating an estimated position of the NED 605 relative to an initial position of the NED 605 based on measurement signals received from one or more of the position sensors 125. A position sensor 125 generates one or more measurement signals in response to motion of the NED 605. Examples of position sensors 125 include: one or more accelerometers, one or more gyroscopes, one or more magnetometers, another suitable type of sensor that detects motion, a type of sensor used for error correction of the IMU 130, or some combination thereof. The position sensors 125 may be located external to the IMU 130, internal to the IMU 130, or some combination thereof. In the embodiment shown by FIG. 6, the position sensors 125 are located within the IMU 130, and neither the IMU 130 nor the position sensors 125 are visible to the user (e.g., located beneath an outer surface of the NED 605).

Based on the one or more measurement signals generated by the one or more position sensors 125, the IMU 130 generates fast calibration data indicating an estimated position of the NED 605 relative to an initial position of the NED 605. For example, the position sensors 125 include multiple accelerometers to measure translational motion (forward/back, up/down, left/right) and multiple gyroscopes to measure rotational motion (e.g., pitch, yaw, roll). In some embodiments, the IMU 130 rapidly samples the measurement signals from various position sensors 125 and calculates the estimated position of the NED 605 from the sampled data. For example, the IMU 130 integrates the measurement signals received from one or more accelerometers over time to estimate a velocity vector and integrates the velocity vector over time to determine an estimated position of a reference point (not shown) on the NED 605. The reference point is a point that may be used to describe the position of the NED 605. While the reference point may generally be defined as a point in space; however, in practice, the reference point is defined as a point within the NED 605 (e.g., the reference point representing a center of the IMU 130).

The imaging device 635 generates slow calibration data in accordance with calibration parameters received from the console 610. The imaging device 635 may include one or more cameras, one or more video cameras, one or more filters (e.g., used to increase signal to noise ratio), or any combination thereof. The imaging device 635 is configured to detect image light emitted or reflected in the FOV of the imaging device 635. In embodiments where the NED 605 include passive elements (e.g., a retroreflector), the imaging device 635 may retro-reflect the image light towards the image light source in the imaging device 635. Slow calibration data is communicated from the imaging device 635 to the console 610, and the imaging device 635 receives one or more calibration parameters from the console 610 to adjust one or more imaging parameters (e.g., focal length, focus, frame rate, ISO, sensor temperature, shutter speed, aperture, etc.).

The input/output interface 640 is a device that allows a user to send action requests to the console 610. An action request is a request to perform a particular action. For example, an action request may be to start or end an application or to perform a particular action within the application. The input/output interface 640 may include one or more input devices. Example input devices include: a keyboard, a mouse, a game controller, or any other suitable device for receiving action requests and communicating the received action requests to the console 610. An action request received by the input/output interface 640 is communicated to the console 610, which performs an action corresponding to the action request. In some embodiments, the input/output interface 640 may provide haptic feedback to the user in accordance with instructions received from the console 610. For example, haptic feedback is provided when an action request is received, or the console 610 communicates instructions to the input/output interface 640 causing the input/output interface 640 to generate haptic feedback when the console 610 performs an action.

The console 610 provides media to the NED 605 for presentation to the user in accordance with information received from one or more of: the imaging device 635, the NED 605, and the input/output interface 640. In the example shown in FIG. 6, the console 610 includes an application store 645, a tracking module 650, and an engine 655. Some embodiments of the console 610 have different modules than those described in conjunction with FIG. 6. Similarly, the functions further described below may be distributed among components of the console 610 in a different manner than is described here.

The application store 645 stores one or more applications for execution by the console 610. An application is a group of instructions, that when executed by a processor, generates content for presentation to the user. Content generated by an application may be in response to inputs received from the user via movement of the NED 605 or the input/output interface 640. Examples of applications include: gaming applications, conferencing applications, video playback application, or other suitable applications.

The tracking module 650 calibrates the system 600 using one or more calibration parameters and may adjust one or more calibration parameters to reduce error in determination of the position of the NED 605. For example, the tracking module 650 adjusts the focus of the imaging device 635 to obtain a more accurate position on the NED 605. Moreover, calibration performed by the tracking module 650 also accounts for information received from the IMU 630. Additionally, if tracking of the NED 605 is lost, the tracking module 650 re-calibrates some or the entire system 600.

The tracking module 650 tracks movements of the NED 605 using slow calibration information from the imaging device 635. The tracking module 650 also determines positions of a reference point of the NED 605 using position information from the fast calibration information. Additionally, in some embodiments, the tracking module 650 may use portions of the fast calibration information, the slow calibration information, or some combination thereof, to predict a future location of the NED 605. The tracking module 650 provides the estimated or predicted future position of the NED 605 to the engine 655.

The engine 655 executes applications within the system 600 and receives position information, acceleration information, velocity information, predicted future positions, or some combination thereof of the NED 605 from the tracking module 650. In some embodiments, the information received by the engine 655 may be used for producing a signal (e.g., switching instructions) to the display assembly 615 that determines the type of content presented to the user. For example, if the received information indicates that the user has looked to the left, the engine 655 generates content for the NED 605 that mirrors the user's movement in a virtual environment by determining the appropriate switching time of the array of liquid crystal gratings of the output waveguide in the display assembly 615. For example, the engine 655 may produce a display instruction that would cause the display assembly 615 to generate content that would move along with the eye position tracked. Additionally, the engine 655 performs an action within an application executing on the console 610 in response to an action request received from the input/output interface 640 and provides feedback to the user that the action was performed. The provided feedback may be visual or audible feedback via the NED 605 or haptic feedback via the input/output interface 640.

Additional Configuration Information

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A near-eye-display (NED) system comprising:
    an eye tracking system configured to track a location of an eye of a user of the NED;
    a light source configured to emit an image light;
    an output waveguide comprising:
        an input grating configured to receive the image light emitted from the light source and expand the received image light in at least one dimension to transmit an expanded image light, and
        a dynamic output grating comprising a plurality of liquid crystal (LC) pixels that are arranged in a two-dimensional array, the plurality of LC pixels including an active subset of LC pixels that are configured to out-couple the expanded image light from the output waveguide to the tracked location in accordance with switching instructions; and
    a controller configured to generate the switching instructions and provide the switching instructions to the dynamic output grating.

2. The NED of claim 1, wherein the dynamic output grating is transparent in a visible band of light.

3. The NED of claim 1, wherein the controller is further configured to:
    determine an eyebox location based in part on the tracked location of the eye;
    determine a subset of the plurality of LC pixels that are configured to emit light that falls within the eyebox location; and
    generate the switching instructions, wherein the switching instructions cause the dynamic output grating to activate the subset of plurality of LC pixels to form the active subset of LC pixels.

4. The NED of claim 3, wherein the LC pixels that are not in the active subset are in an inactive subset of LC pixels that do not out-couple light from the dynamic output grating.

5. The NED of claim 3, wherein the eyebox has a diameter of at most 5 mm.

6. The NED of claim 3, wherein the eyebox corresponds to a location of a pupil of the eye.

7. The NED of claim 1, wherein each LC pixel is coupled to at least one control electrode that sets an activation state of the LC pixel based in part on the switching instructions.

8. The NED of claim 1, wherein the two-dimensional array of LC pixels are a linear waveplate with a periodically varying LC director.

9. A waveguide assembly comprising:
    an output waveguide comprising:
        an input grating configured to receive image light emitted from a light source and expand the received image light in at least one dimension to transmit an expanded image light, and
        a dynamic output grating comprising a plurality of liquid crystal (LC) pixels that are arranged in a two-dimensional array, the plurality of LC pixels including an active subset of LC pixels that are configured to out-couple the expanded image light from the output waveguide to an eyebox location in accordance with switching instructions; and
    a controller configured to generate the switching instructions and provide the switching instructions to the dynamic output grating.

10. The waveguide assembly of claim 9, wherein the dynamic output grating is transparent in a visible band of light.

11. The waveguide assembly of claim 9, wherein the controller is further configured to:
    determine an eyebox location based in part on the tracked location of the eye;
    determine a subset of the plurality of LC pixels that are configured to emit light that falls within the eyebox location; and
    generate the switching instructions, wherein the switching instructions cause the dynamic output grating to activate the subset of plurality of LC pixels to form the active subset of LC pixels.

12. The waveguide assembly of claim 11, wherein the LC pixels that are not in the active subset are in an inactive subset of LC pixels that do not out-couple light from the dynamic output grating.

13. The waveguide assembly of claim 11, wherein the eyebox has a diameter of at most 5 mm.

14. The waveguide assembly of claim 11, wherein the eyebox corresponds to a location of a pupil of the eye.

15. The waveguide assembly of claim 11, wherein each LC pixel is coupled to at least one control electrode that sets an activation state of the LC pixel based in part on the switching instructions.

16. The waveguide assembly of claim 11, wherein the two-dimensional array of LC pixels are a linear waveplate with a periodically varying LC director.

* * * * *